(12) United States Patent
Belzile et al.

(10) Patent No.: US 7,849,614 B2
(45) Date of Patent: Dec. 14, 2010

(54) UNIVERSAL FRONT AND REAR EQUIPMENT MOUNT FOR ATV

(75) Inventors: Luc Belzile, Petit-Shippagan (CA); J. Edward Melin, Warrensburg, MO (US)

(73) Assignee: Swisher Acquisition, Inc., Chevy Chase, MD (US)

( * ) Notice: Subject to any disclaimer, the term of this patent is extended or adjusted under 35 U.S.C. 154(b) by 0 days.

(21) Appl. No.: 12/031,144

(22) Filed: Feb. 14, 2008

(65) Prior Publication Data

US 2008/0222925 A1    Sep. 18, 2008

Related U.S. Application Data

(60) Provisional application No. 60/901,776, filed on Feb. 16, 2007.

(51) Int. Cl.
*E01H 5/04* (2006.01)

(52) U.S. Cl. ............................. 37/231; 37/235; 37/241; 172/810

(58) Field of Classification Search ................. 37/231, 37/235, 241; 172/810, 811, 272, 817, 828, 172/829; 280/495, 503
See application file for complete search history.

(56) References Cited

U.S. PATENT DOCUMENTS

| | | | | | |
|---|---|---|---|---|---|
| 1,550,780 | A | * | 8/1925 | Cerasoli | 172/817 |
| 1,701,746 | A | * | 2/1929 | Cook | 37/274 |
| 1,918,771 | A | * | 7/1933 | Meyer | 37/231 |
| 2,091,343 | A | | 8/1937 | Soule, et al. | |
| 2,198,407 | A | * | 4/1940 | De Brun | 37/253 |
| 2,333,361 | A | * | 11/1943 | Churchill | 37/273 |
| 2,695,467 | A | * | 11/1954 | Woods | 172/817 |
| 2,867,921 | A | * | 1/1959 | Brown | 37/231 |
| 2,979,839 | A | * | 4/1961 | Hugger | 172/817 |
| 3,226,860 | A | * | 1/1966 | McGee | 172/817 |
| 3,618,671 | A | * | 11/1971 | Chantland | 172/297 |
| 3,688,847 | A | * | 9/1972 | Deeter | 172/817 |
| 3,749,421 | A | * | 7/1973 | Rudd | 172/439 |
| 3,760,516 | A | * | 9/1973 | Billingsley | 37/231 |
| 3,800,447 | A | * | 4/1974 | Harvey | 37/236 |
| 4,369,590 | A | * | 1/1983 | Miller | 37/231 |
| 4,403,432 | A | * | 9/1983 | Biance | 37/235 |

(Continued)

FOREIGN PATENT DOCUMENTS

CA            326141            9/1932

(Continued)

*Primary Examiner*—Thomas A Beach
*Assistant Examiner*—Matthew R Buck
(74) *Attorney, Agent, or Firm*—Patton Boggs LLP

(57) ABSTRACT

A universal front and rear equipment mount for an ATV includes a telescoping central frame member with telescoping front and rear mounting arms extending therefrom for connection to independent axle structures of the ATV, front and rear angled hitch brackets, each with upturned tabs having aligned holes to receive a hitch pin, and front and rear angled pulley brackets having pulleys mounted thereon for routing a winch cable of a winch mounted either on the front or rear of the vehicle or on the front or rear pulley brackets. An implement can be hitched either to the front or rear hitch bracket, and the implement can be raised or lowered by use of the winch, which has its cable routed over selected pulleys and connected to a hitch tongue or other part of the implement.

16 Claims, 3 Drawing Sheets

U.S. PATENT DOCUMENTS

| | | | |
|---|---|---|---|
| 4,470,211 A * | 9/1984 | Rossmann | 37/231 |
| 4,554,978 A * | 11/1985 | Schneider | 172/247 |
| 4,563,019 A * | 1/1986 | Kuhn et al. | 280/481 |
| 4,790,085 A * | 12/1988 | Rossman | 37/231 |
| 4,907,357 A * | 3/1990 | Lilienthal | 37/197 |
| 5,050,322 A * | 9/1991 | Burkard | 37/270 |
| 5,167,423 A * | 12/1992 | Hall, Jr. | 280/486 |
| 5,299,821 A * | 4/1994 | Hurlburt | 280/503 |
| 6,178,668 B1 * | 1/2001 | Gustafson et al. | 37/231 |
| 6,293,351 B1 * | 9/2001 | Schmidt | 172/439 |
| D460,084 S | 7/2002 | Belzile | |
| 6,931,770 B2 * | 8/2005 | Belzile | 37/231 |
| 6,932,555 B2 | 8/2005 | Dale et al. | |
| 7,093,380 B2 * | 8/2006 | Hubscher et al. | 37/231 |
| 7,093,381 B2 * | 8/2006 | Belzile | 37/231 |
| 7,302,765 B1 * | 12/2007 | Jorgenson et al. | 37/231 |
| 2002/0028125 A1 | 3/2002 | Belzile | |
| 2006/0283053 A1 * | 12/2006 | Hickenbottom | 37/231 |
| 2007/0084089 A1 * | 4/2007 | Shoemaker | 37/231 |

FOREIGN PATENT DOCUMENTS

| | | |
|---|---|---|
| CA | 535370 | 1/1957 |
| CA | 2357675 C | 3/2003 |
| CA | 2562413 A1 | 3/2008 |

* cited by examiner

UNIVERSAL FRONT AND REAR EQUIPMENT MOUNT FOR ATV

CROSS-REFERENCE TO RELATED APPLICATION

This application claims priority under 35 U.S.C. 119(e) and 37 C.F.R. 1.78(a)(4) based upon U.S. Provisional Application Ser. No. 60/901,776 for UNIVERSAL FRONT AND REAR EQUIPMENT MOUNT FOR ATV, filed Feb. 16, 2007, which is incorporated herein by reference.

BACKGROUND OF THE INVENTION

This invention relates to a mount or mounting structure for attaching equipment such as a snowplow, bucket loader, fork lift, or the like to a wheeled vehicle, and in particular to such a mount which can support the equipment as unsprung weight on a vehicle having independent front suspension. It is well known to attach equipment such as a snowplow, a dozer bucket, a fork lift, a power broom, some types of mowers, or the like to the front of a wheeled vehicle such as a garden tractor, a small truck, an all-terrain vehicle (ATV), or other vehicle. It is also common to attach other equipment to the rear of such a vehicle, such as a box scraper, a rear angle grader blade, a tines cultivator, a trailing type of mower, a cargo carrier, such as a game carrier, a trailer, or the like. Mounting such equipment on a tractor is a relatively straight forward procedure because tractors do not typically have any suspension system; i.e. the axles of a tractor are rigidly affixed to the chassis. The equipment can, therefore, be mounted in any convenient location on the vehicle with little concern as to the effect of the weight of the equipment on the handling of the vehicle.

When mounting equipment on a truck, ATV, or other vehicle having a suspension, the weight of the equipment becomes a concern. Typically, the equipment is bolted to the frame of the vehicle and the weight of the equipment and any load supported thereon becomes sprung weight, meaning that the weight must be supported by the springs in the vehicle's suspension. Too much sprung weight on the front of a vehicle can cause the front suspension to sag, bottom out, or even collapse and can additionally cause steering problems.

This problem as been previously addressed in vehicles having solid beam-type front axles by supporting the weight of the equipment on the front axle. For example, U.S. Pat. No. 2,091,343 issued to G. C. Soule et al. in 1937 discloses a snowplow mount for a truck with a beam axle. The weight of the snowplow is carried by brackets which hook over and attach to the front axle. The plow is stabilized by a framework which extends rearwardly under the truck and bolts to the truck frame forward of the rear wheels. The result is that the weight of the snowplow is not carried by the truck's suspension, but instead becomes unsprung weight supported only by the axle and front wheels. The only force transmitted to the frame is an upward force near the rear of the vehicle which, due to the length of the framework, is only a fraction of the weight of the plow. Similar inventions are disclosed by Canadian Patent Nos. 326,141 and 535,370.

With some types of equipment that is connected to the front or rear of such vehicles, it is desirable to have a means of raising or lowering the equipment. For example, a front or rear mounted scraper blade needs to be lowered when scraping is needed and raised for traveling to the worksite or in maneuvering about the worksite. Small tractors and all terrain vehicles typically are not equipped with hydraulic cylinders for such raising and lowering of equipment. However, some vehicles of these types are equipped with winches.

While equipment mounts as described above work acceptably well in older vehicles or large trucks having solid front axles, they are not applicable to newer light trucks, sport utility vehicles, or ATVs having independent front suspension since these vehicles have no axle to which to attach the equipment mount. What is needed is an improved equipment mount capable of mounting equipment on a wheeled vehicle wherein the mount is designed to support the equipment as unsprung weight. U.S. Pat. Nos. 6,931,770 and 7,093,381, issued to one of the inventors of the present invention and incorporated herein by reference, disclose a mounting structure for attaching equipment to the front of an ATV and which is connected at a rear end to the vehicle chassis and to the front axles of the vehicle. However, the '770 and '381 patents do not provide a means for attaching equipment to the rear of such a vehicle or for raising and lowering such equipment either at the front or at the rear.

SUMMARY OF THE INVENTION

The present invention provides equipment mounting structure for attaching implements to either the front end or the rear end of a wheeled vehicle and includes the capability of raising and lowering such implements. The mounting generally includes a central longitudinal frame with transverse arms for connecting the structure to axles of the vehicle. The central longitudinal frame preferably includes telescoping members which can be secured at a variety of lengths to enable the structure to be connected to vehicles of various wheelbase lengths. Similarly, the transverse arms are adjustable in length to accommodate a range of vehicle track widths. In one embodiment of the mounting structure, the adjustable transverse arms are sections of leaf springs which are clamped to the telescoping central frame members. Outer ends of the leaf spring sections are adapted for connection to axles of the vehicle to which an implement or implements are to be connected. The central frame is preferably provided with a bolt for connection of the central frame at the rear end to a hitch socket of the vehicle. By this means, pulling or pushing forces on the attached implement are transferred to the vehicle chassis, while the weight of the mounting structure and any implement carried thereon is supported by the vehicle axles.

The front and rear ends of the central frame are provided with implement hitch brackets to which various implements can be pivotally connected. In one embodiment, the implement hitch brackets have an isosceles triangle shape with aligned apertures to receive a transverse hitch pin to thereby connect the desired implement to the mounting structure. Additionally, the front and rear ends are provided with angularly extending pulley brackets which provide pulleys to route a cable from an electric winch. The winch cable may be connected to the hitched implement so that it can be raised and lowered by operation of the winch. The winch can be located on the front or rear of the vehicle, and the cable can be routed to the same end or to the opposite end of the vehicle by use of the pulleys. Alternatively, a winch unit can be mounted directly on the pulley brackets at either the front or rear of the vehicle, and the cable can be used at that end or routed to the opposite end by use of the pulleys.

The equipment mounting structure of the present invention is adapted for convenient removal from the host vehicle so that the vehicle can be used without carrying the mounting structure. For this purpose, mounting brackets are mounted on the axles of the vehicle to receive the ends of the transverse arms. When the mounting structure is removed from the vehicle, the mounting brackets remain on the axles. Additionally, one end of the central frame, such as the rear end, may be connected to the remaining portion by a single hitch pin, which can be removed to enable separation of the end so that the portions of the mounting structure can be detached without disassembling the pulley brackets, which may be too tall for the vehicle to clear otherwise.

Various objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
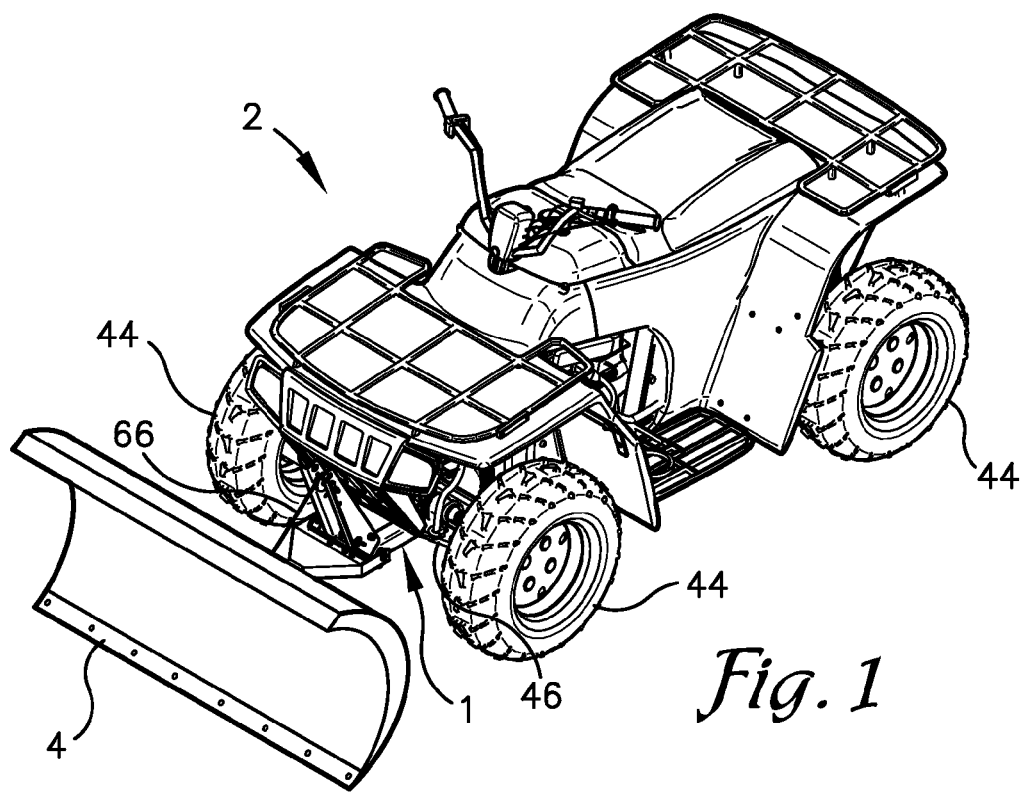
FIG. 1 is a perspective view of an all terrain vehicle (ATV) on which an embodiment of a front and rear equipment mounting structure of the present invention is mounted.
Figure 2:
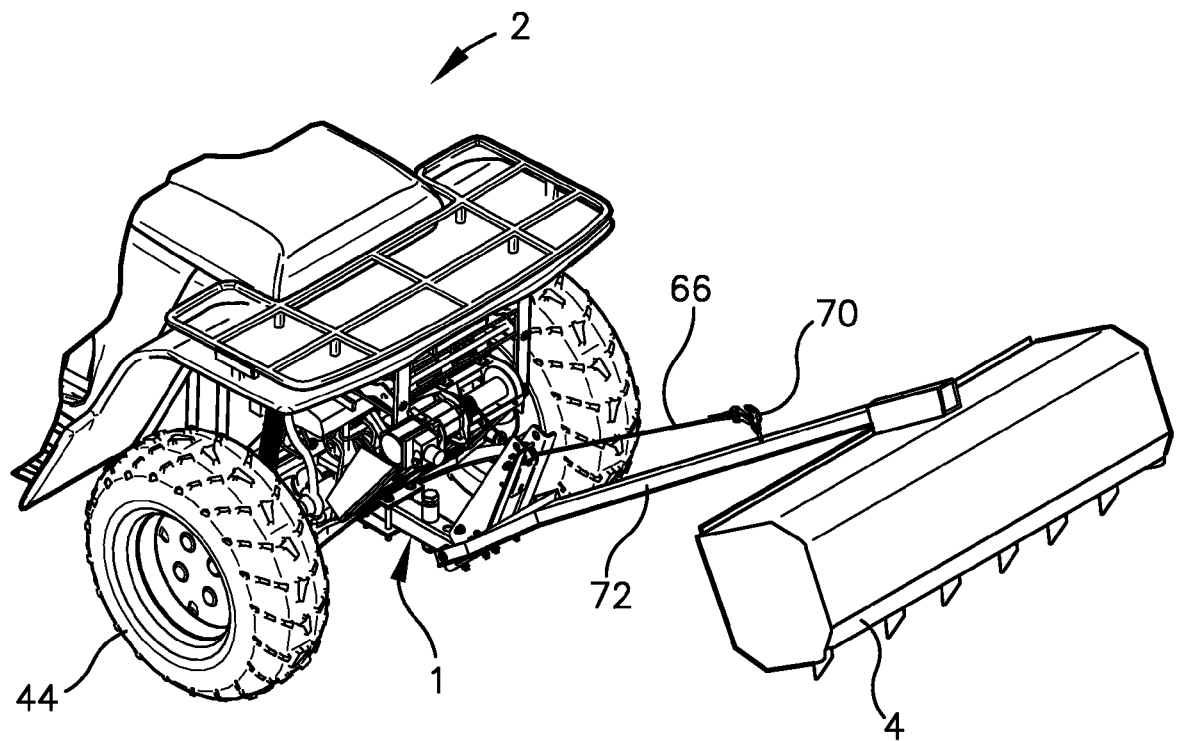
FIG. 2 is a fragmentary view of the ATV showing an implement attached to the rear of the vehicle by use of the equipment mounting structure.

Referring now to the drawing figures, the reference numeral 1 generally designates a universal front and rear equipment mount or mounting structure which is an embodiment of the present invention. The mounting structure 1 is particularly well adapted for use with a four-wheel all-terrain-vehicle (ATV) 2 (FIGS. 1 and 2), although the mounting structure 1 is not intended to be restricted to such use. The mounting structure 1 is used for attaching equipment or implements 4 to the vehicle 2.

Figure 3:
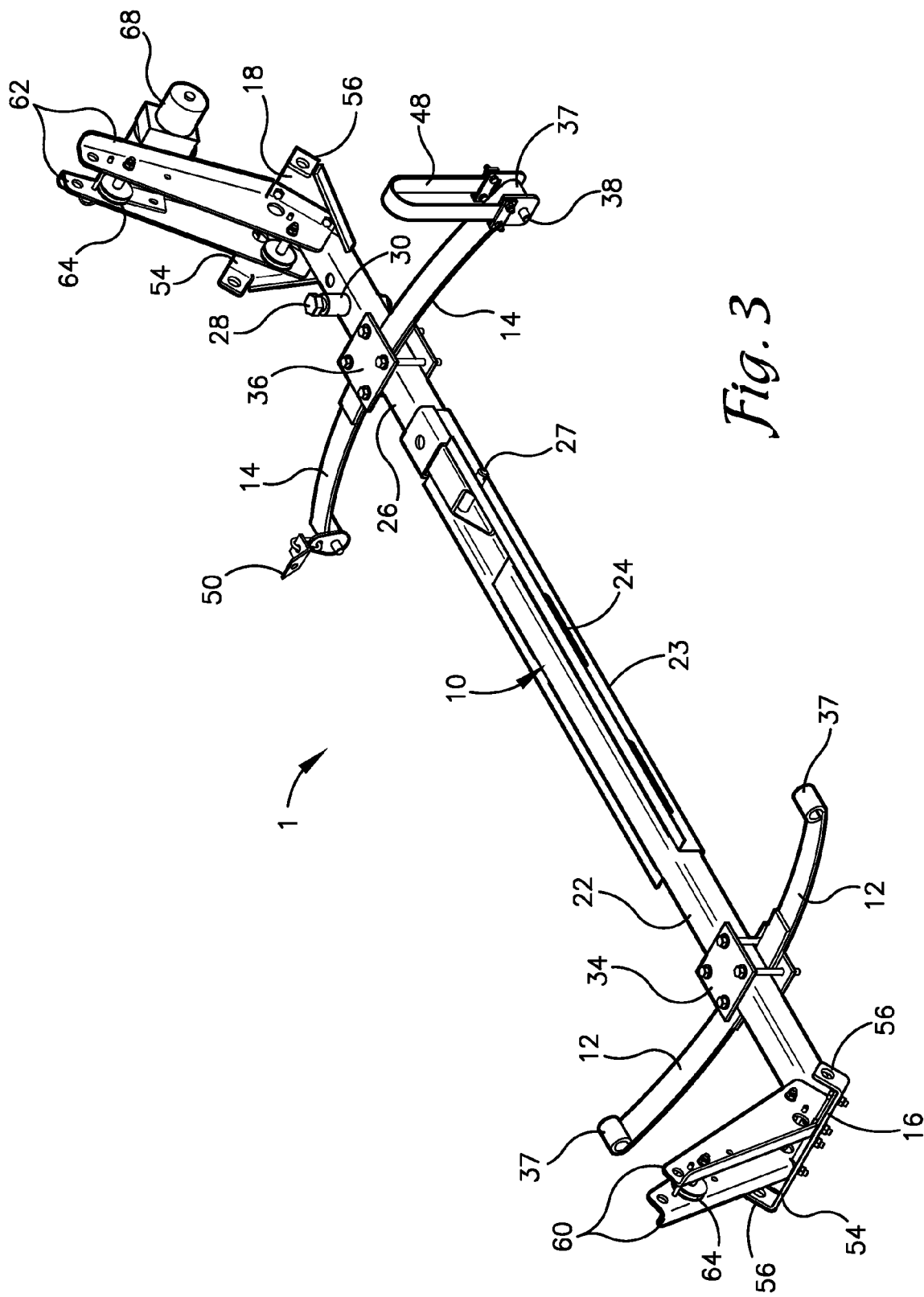
FIG. 3 is a perspective view at an enlarged scale and shows details of an embodiment of the front and rear equipment mounting structure of the present invention.

Referring to FIG. 3, the mounting structure 1 generally includes an elongated central frame 10 having front and rear sets of transverse arms 12 and 14 extending laterally therefrom. The central frame 10 has a front hitch bracket 16 and a rear hitch bracket 18 positioned thereon at respective front and rear ends. The transverse arms 12 and 14 provide for connection of the mounting structure 1 to the vehicle 2. The hitch brackets 16 and 18 provide for connection of the equipment 4 to the vehicle 2.

The illustrated central frame 10 includes front and rear telescoping frame components 22 and 23 which allows the overall length of the central frame 10 to be adjusted according to the wheelbase length of the particular ATV 2. The illustrated front component 22 is a square tubular member, while the illustrated rear component 23 is a channel member. One of the components 22 or 23 has slots 24, such as the rear component 23, and the other component has holes (not shown) to receive fasteners (not shown) to secure the components in a selected telescoping relationship to fit the particular vehicle 2. Alternatively, types of beam stocks and shapes other than square tubes and channels are contemplated for use on the central frame. Additionally, it is foreseen that the central frame 10 could be formed of parallel members and could also be of a fixed length for a particular brand or model of vehicle 2. The illustrated central frame 10 includes a quick disconnect section 26, illustrated at the rear of the frame 10. The section 26 is secured to the rear component 23 by a hitch pin 27. The quick disconnect section 26 facilitates mounting and dismounting of the structure 1, as will be detailed below. The section 26 includes a chassis fastener 28, such as the illustrated bolt, to connect the central frame 10 to a chassis member, such as a hitch socket or the like (not shown). Connection of the fastener 28 enables pushing and pulling forces generated by use of an implement 4 to be transferred to the chassis of the vehicle 2. The fastener 28 may include a cylindrical roller 30 thereon, as will be described further.

The transverse arms 12 and 14 are preferably adjustable in length to accommodate vehicles 2 having various track widths. The illustrated front and rear arms 12 and 14 are sections of leaf springs which are secured to the central frame 10 by respective clamp units 34 and 36. Each clamp unit includes upper and lower plates and sets of fasteners, such as bolts and nuts. On the mounting structure 1 illustrated in FIG. 3, the front clamp 34 is mounted on the front component 22 of the central frame 10, while the rear clamp 36 is mounted on the quick disconnection section 26. Alternatively, the rear clamp 36 could be mounted on the rear component 23 depending on the relative lengths of the sections of the central frame 10. As illustrated, the arms 12 and 14 can be clamped in a number of ways including on the lower side of the central frame 10 curving upwardly, such as the front arms 12 illustrated in FIG. 3, on the upper side curving downwardly, such as the rear arms 14 in FIG. 3, on the lower side curving downwardly, or on the upper side curving upwardly, depending on the geometry of particular the vehicle 2 on which the structure 1 is to be mounted.

Outer ends 37 of the illustrated arms 12 and 14 are rolled to receive pins 38 to connect the arms to the vehicle 2. Alternatively, the outer ends 37 could be configured in some other manner to enable connection to the vehicle 2. The mounting structure 1 of the present invention is intended to be connected to the vehicle 2 as "unsprung" weight. That is, it is not intended for the chassis of the vehicle 2 to support the weight of the mount structure 1 and any implements or equipment 4 hitched to the structure 1. Thus, the weight of the structure 1 and equipment 4 is intended to be supported by the wheels 44 of the vehicle 2 or, more particularly, by the wheel axles or axle structures 46, whether solid or independent. FIG. 3 illustrates two types of axle connection elements which can be employed, depending on the configuration of the particular axles 46, including a U-shaped axle strap 48 and a quick link set 50. Alternatively, other types of connection elements can be employed, such as spaced apart tabs with aligned holes (not shown). In many arrangements, the connection elements can be permanently secured to the axles 46 whereby the mounting structure 1 can be conveniently installed on the vehicle 2 when needed and otherwise removed.

Referring to FIG. 3, the illustrated front and rear hitch brackets 16 and 18 are formed by bracket plates 54 having triangular shapes, such as isosceles triangles and have transversely spaced upturned tabs 56 with aligned holes to receive an attaching or hitch pin 58 (FIG. 5) to connect an implement 4 to the mounting structure 1. It is foreseen that the hitch bracket plates 54 could alternatively have other shapes besides triangular. The hitch pin 58 may be secured in place with a fastener 59 such as a spring clip, a Cotter pin, or the like. The illustrated hitch brackets 16 and 18 are secured to the front and rear ends of the central frame 10 to orient them in an upwardly angular manner to position the holes in the tabs 56 at a desired height above ground to have the implements 4 secured thereto.

Figure 4:
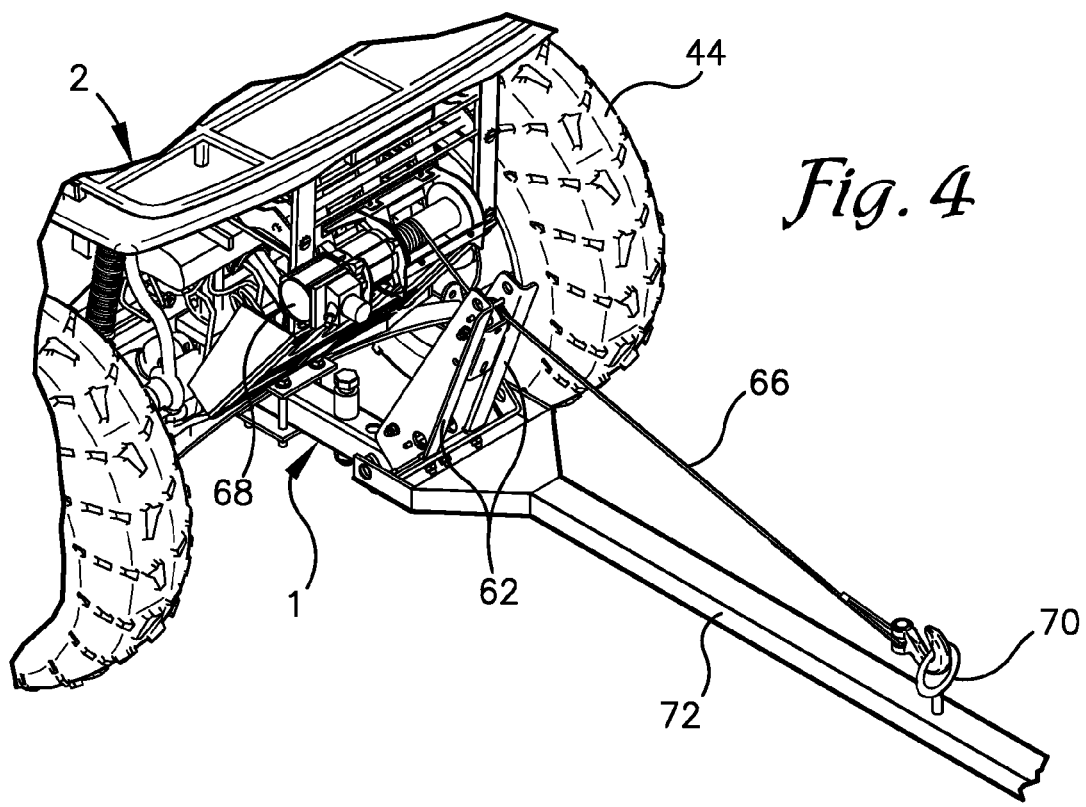
FIG. 4 is a fragmentary perspective view of the rear end of the equipment mounting structure and shows an implement connected to the structure along with a vehicle mounted winch.
Figure 5:
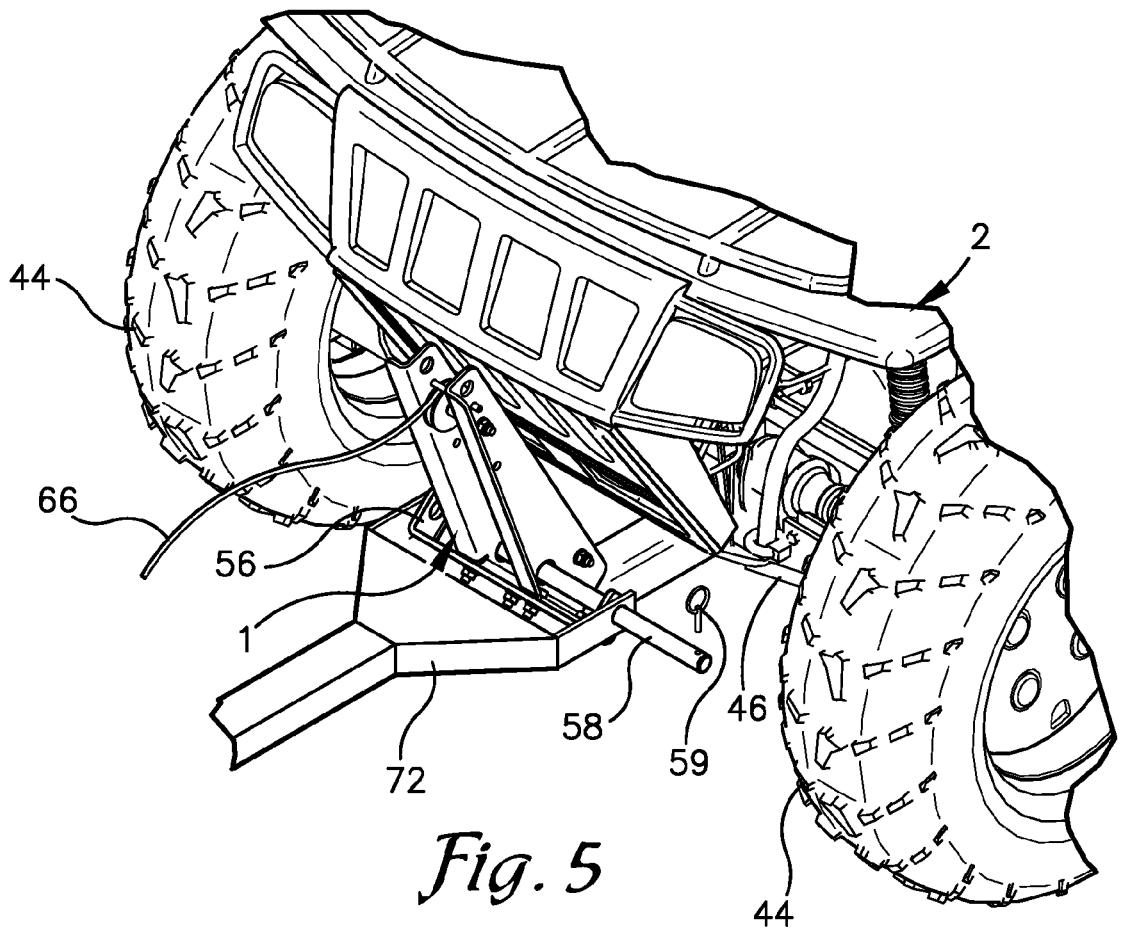
FIG. 5 is a fragmentary perspective view of a front end of the equipment mounting structure and shows a winch cable extending from a pulley bracket to an implement for raising and lowering the implement by use of a winch located at the rear of the vehicle.

The front end of the central frame 10 has a pair of spaced apart, upwardly extending, and angularly oriented front pulley brackets 60. Similarly, a pair of rear pulley brackets 62 are connected to the central frame 10 at a rear end thereof. The illustrated pulley brackets 60 and 62 are formed of angle stock and are connected to the respective hitch brackets 16 and 18, as by bolts and nuts. Pulleys or sheaves 64 are rotatably mounted between the sets of pulley brackets 60 and 62 for the purpose of routing a winch cable 66 (FIG. 7) of a winch 68 (FIGS. 4 and 5). The winch 68 can be mounted on the vehicle 2, as shown in FIG. 5, either at the front or the rear, or it can be mounted on one of the sets of pulley brackets 60 or 62 at the front or rear of the central frame 10. The winch cable 66 is used in the present invention primarily for raising and lowering the implement 4, as by connection to an eyebolt 70 (FIG. 10) or other attachment point on a hitch tongue 72 or other part of the implement 4. The winch cable 66 can be used at the same end at which the winch 68 is mounted or it can be routed to the opposite end using the pulleys 64, preferably the lower pulleys on each pulley bracket 60 and 62 to position the cable 66 close to the central frame 10. The roller 30 on the chassis fastener 28 allows the cable 66 to ride past the fastener 28 with minimal wear on either. The winch cable 66 can also be used in some circumstances to lift the end of the implement 4 to a position for connection to one of the hitch brackets 16 or 18.

The quick disconnection section 26 of the central frame 10 is provided to facilitate attachment of the structure 1 to the vehicle 2 and the removal of the structure 1 therefrom, without the need to jack either end of the vehicle 2 up to clear the pulley brackets 60 and 62. By this means, the quick disconnection section 26 can be extended under the rear of the vehicle 2 while the remaining portions are extended under the front of the vehicle 2. Similarly, for removal, the portions of the structure 10 can be removed from opposite ends of the vehicle 2.

It is to be understood that while certain forms of the present invention have been illustrated and described herein, it is not to be limited to the specific forms or arrangement of parts described and shown.

What is claimed and desired to be secured by Letters Patent is:

1. An unsprung vehicle comprising:
   an independent front and rear suspension;
   front and rear axles supporting ground engaging wheels; and
   a universal front and rear equipment mounting structure for connecting equipment to a front and rear end of the vehicle, said structure comprising:
   an elongated central frame member having a front end and an opposite rear end;
   a pair of front transverse arms extending transversely from opposite sides of said central frame member near said front end thereof, outer ends of said front transverse arms being secured to said front axle of said vehicle;
   a pair of rear transverse arms disposed on said central frame member and extending transversely away from exterior opposite sides of said central frame member near said rear end thereof, outer ends of said rear transverse arms being secured to said rear axle of said vehicle;
   a front hitch bracket positioned on said front end of said central frame member;
   a rear hitch bracket positioned on said rear end of said central frame member; and
   said front and rear hitch brackets enabling selective connection of an implement thereto.

2. A vehicle as set forth in claim 1 wherein:
said central frame member is adjustable in length.

3. A vehicle as set forth in claim 1 wherein:
said front and rear transverse arms are each adjustable in length.

4. A vehicle as set forth in claim 1 wherein:
said front and rear transverse arms are formed by leaf springs.

5. A vehicle as set forth in claim 1 further comprising
a pulley bracket extending from one of said ends of said central frame member; and
a pulley mounted on said pulley bracket to enable routing of a winch cable from a winch by way of said pulley to an implement connected to said structure.

6. A vehicle as set forth in claim 5 wherein:
said winch is mounted on said pulley bracket.

7. A vehicle as set forth in claim 1 further comprising
a front pulley bracket extending from said front end of said central frame member and a rear pulley bracket extending from said rear end of said central frame member; and
a respective pulley mounted on each of said pulley brackets to enable routing of a winch cable from a winch by way of the pulley to an implement connected to said structure.

8. A vehicle as set forth in claim 1 further comprising
a chassis fastener positioned on said central frame member to enable connection of said central frame member to said chassis of said vehicle.

9. An equipment mounting structure for connecting equipment to the front or rear end of a vehicle having front and rear axles supporting ground engaging wheels, said structure comprising:
   (a) an elongated central frame member having a front end and an opposite rear end, said central frame member being adjustable in length;
   (b) a pair of front transverse arms extending transversely from opposite sides of said central frame member near said front end thereof, outer ends of said front transverse arms being secured to said front axle of said vehicle;
   (c) a pair of rear transverse arms extending transversely from opposite sides of said central frame member near said rear end thereof, outer ends of said rear transverse arms being secured to said rear axle of said vehicle;
   (d) said front and rear transverse arms are each adjustable in length;
   (e) a winch mounted to one of said front end or said opposite rear end, said winch having a winch cable routed to an opposite end from which said winch is mounted;

(f) a pair of front pulley brackets extending from said front end of said central frame member and a pair of rear pulley brackets extending from said rear end of said central frame member; and (g) a respective pulley mounted between each of said pairs of pulley brackets to enable routing of said winch cable by way of said pulleys to an implement connected to said structure.

10. A structure as set forth in claim 9 wherein:

(a) said front and rear transverse arms are formed by leaf springs.

11. A structure as set forth in claim 9 wherein said vehicle has a vehicle chassis and including:

(a) a chassis fastener positioned on said central frame member to enable connection of said central frame member to said chassis of said vehicle.

12. A structure as set forth in claim 11, further comprising (a) a roller disposed on said chassis fastener, said roller being configured and arranged to allow said winch cable to ride past said chassis fastener.

13. An equipment mounting structure for connecting equipment to the front or rear end of a vehicle having front and rear axles supporting ground engaging wheels, said structure comprising:

(a) an elongated central frame member having a front end and an opposite rear end, said central frame member being adjustable in length;

(b) a pair of front transverse arms extending transversely from opposite sides of said central frame member near said front end thereof, outer ends of said front transverse arms being secured to said front axle of said vehicle;

(c) a pair of rear transverse arms extending transversely from opposite sides of said central frame member near said rear end thereof, outer ends of said rear transverse arms being secured to said rear axle of said vehicle;

(d) said front and rear transverse arms are each adjustable in length;

(e) a front hitch bracket positioned on said front end of said central frame member;

(f) a rear hitch bracket positioned on said rear end of said central frame member;

(g) said front and rear hitch brackets enabling selective connection of an implement thereto;

(h) a pair of front pulley brackets extending from said front end of said central frame member and a pair of rear pulley brackets extending from said rear end of said central frame member;

(i) a winch mounted on one of said pair of pulley brackets and having a winch cable engaged therewith; and (j) a respective pulley mounted on each of said pair of pulley brackets to enable routing of said winch cable from said winch by way of at least one of said pulleys on said pulley brackets to an implement connected to said structure.

14. A structure as set forth in claim 13 wherein:

(a) said front and rear transverse arms are formed by leaf springs.

15. A structure as set forth in claim 13 wherein said vehicle has a vehicle chassis and including:

(a) a chassis fastener positioned on said central frame member to enable connection of said central frame member to said chassis of said vehicle.

16. A structure as set forth in claim 15, further comprising (a) a roller disposed on said chassis fastener, said roller being configured and arranged to allow said winch cable to ride past said chassis fastener.

* * * * *